United States Patent [19]

Gruber et al.

[11] Patent Number: 5,765,516

[45] Date of Patent: Jun. 16, 1998

[54] CHAIN DRIVE PARTICULARLY FOR DRIVING AN ACCESSORY OF AN INTERNAL COMBUSTION ENGINE

[75] Inventors: Gerhard Gruber; Uwe Matena, both of Backnang; Rolf Kasper, Plochingen; Franz-Paul Gulde, Geislingen, all of Germany

[73] Assignee: Mercedes-Benz AG, Stuttgart, Germany

[21] Appl. No.: 865,073

[22] Filed: May 29, 1997

[30] Foreign Application Priority Data

Jun. 5, 1996 [DE] Germany .................. 196 22 676.7

[51] Int. Cl.[6] ........................................ F01M 9/10
[52] U.S. Cl. ........................... 123/90.33; 184/15.1
[58] Field of Search ...................... 123/196 R, 90.33, 123/90.34; 184/6.12, 11.5, 15.1, 15.3

[56] References Cited

U.S. PATENT DOCUMENTS

| | | |
|---|---|---|
| 807,731 | 12/1905 | Dodge .................................. 184/15.1 |
| 3,528,526 | 9/1970 | Resener . |
| 4,024,930 | 5/1977 | Thomson et al. ...................... 184/15.3 |
| 5,063,895 | 11/1991 | Ampferer et al. ..................... 123/196 R |

FOREIGN PATENT DOCUMENTS

| | | |
|---|---|---|
| 2 311 970 | 12/1976 | France . |
| 92 00 487 | 4/1992 | Germany . |
| 41 08 485 | 9/1992 | Germany . |

Primary Examiner—Erick R. Solis
Attorney, Agent, or Firm—Klaus J. Bach

[57] ABSTRACT

In a chain drive particularly for an accessory drive of an internal combustion engine lubricant is supplied to the chain from a lubricant supply through a trunnion carrying the chain gear to a passage extending through the chain gear radially to an area adjacent the chain by way of a groove which is formed in a bearing sleeve disposed on the chain gear hub and which has a flow cross-section of a depth and width selected so as to form a throttle area to limit the lubricant flow.

2 Claims, 2 Drawing Sheets

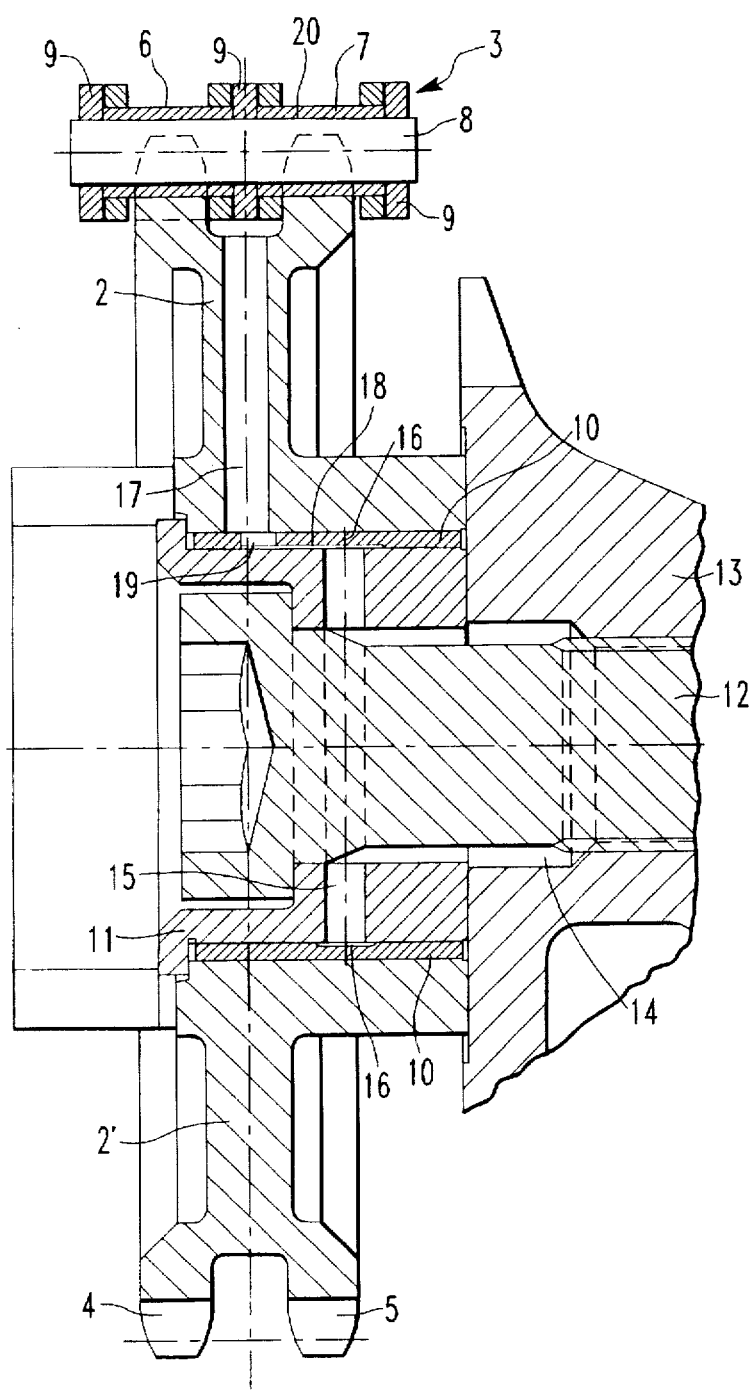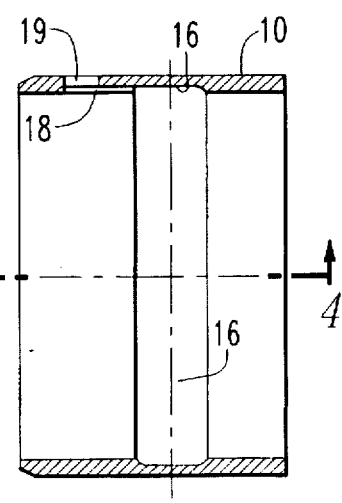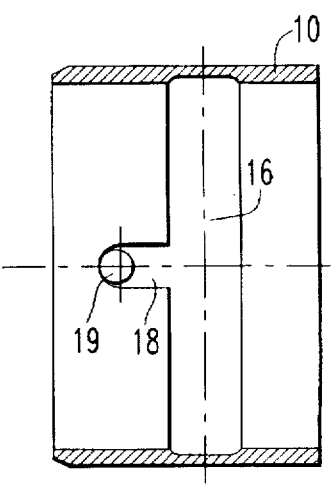

CHAIN DRIVE PARTICULARLY FOR DRIVING AN ACCESSORY OF AN INTERNAL COMBUSTION ENGINE

BACKGROUND OF THE INVENTION

The invention relates to a chain drive particularly for driving an accessory of an internal combustion engine with a drive chain extending around chain gears of which at least one includes a radial bore which is in communication with a lubricant source for supplying lubricant to the chain.

DE GM 92 00 487 discloses such a chain drive wherein, for supplying a lubricant to the chain, a chain gear includes a radial bore which leads to the base area between two adjacent teeth where it has an opening which is closed by a ball valve. The ball valve is periodically opened by the pressure exerted by the chain so that, with the centrifugal force generated by the rotation of the chain gear, small amounts of lubricant are periodically released for lubricating the chain. A reliable and adequate lubrication of the chain however is not guaranteed with such an arrangement since, although the rollers or sleeves of the chain push the ball valve open, they also cover and close the discharge opening of the oil supply bore to a large extent. In addition, the ball valve is closed over a large part of each revolution of the chain gear since the looping angle of the chain rarely exceeds 180°. Also, the ball valve is subjected to relatively high wear so that it may not operate reliably over the long life of an engine.

FR-A 23 11970 discloses a chain drive wherein a chain gear is supported on a stationary trunnion by way of a bearing sleeve. The trunnion includes a longitudinal bore which is in communication with a lubricant source and from which radial passages extend. The bearing sleeve and the chain gear hub have, at each side of the gear, a plurality of outwardly open radial bores which, during rotation of the chain gear, come, one after another, into radial alignment with the radial passages in the stationary trunnion. In this arrangement, the chain is lubricated however only at one point, that is, by the radial bore which is in radial alignment with the respective radial passage.

It is the object of the present invention to provide a chain drive of the type described above wherein, however, the lubrication of the chain is improved and is highly reliable.

SUMMARY OF THE INVENTION

In a chain drive particularly for an accessory drive of an internal combustion engine lubricant is supplied to the chain from a lubricant supply through a trunnion carrying the chain gear to a passage extending through the chain gear radially to an area adjacent the chain by way of a groove which is formed in a bearing sleeve disposed in the chain gear hub and which has a flow cross-section of a depth and width selected so as to form a throttle area to limit the lubricant flow.

In the arrangement according to the invention, the lubrication passage is always open so that the chain links and particularly also the joint areas between the chain sleeves and the pins extending therethrough which are subjected to the greatest wear are effectively lubricated. Furthermore, since lubricant is continuously supplied to the radial bore in the chain gear from the annular groove with which the radial bore is in communication, lubricant is sprayed onto the chain also outside the looping area of the chain that is before the chain engages the chain gear and after the chain leaves the chain gear where the chain is subjected to different forces and different chain surface areas are engaged with one another permitting the lubricant to reach all surface areas of the chain. With this multiple lubrication the wear of the chain is substantially reduced. And without any ball valves the arrangement is simple and inexpensive and it is not subjected to any wear.

A throttling of the lubricant supply which is required to prevent foaming of the lubricant and to maintain lubricant system pressure during low engine speeds can be achieved by appropriate dimensioning of the supply passages of the lubricant or parts thereof. In this respect, it is advantageous to provide in the bearing surface of the bearing sleeve a transverse groove which extends from the annular groove and leads to a bore in the bearing sleeve which is in alignment with the radial bore in the chain gear. The depth and the width of this transverse groove are so selected that it forms a throttle in which the lubricant is throttled to such a degree that the lubricant spray is limited to the desirable amount. At the same time, such throttling ahead of the radial bore insures proper lubrication of the chain gear bearing.

With a double link chain which extends around chain gears with two parallel gear rims the radial bore preferably extends to the surface of the chain gear between the adjacent gear rims.

The invention will be described below in greater detail with reference to the accompanying drawings.

BRIEF DESCRIPTION OF THE DRAWINGS

FIG. 2 is a cross-sectional view taken along line 2—2 of FIG. 1,

FIG. 3 is a cross-sectional view of the bearing sleeve for the chain gear shown in FIGS. 1 and 2, and FIG. 4 is a cross-sectional view taken along line 4—4 of FIG. 3.

DESCRIPTION OF A PREFERRED EMBODIMENT

Figure 1:
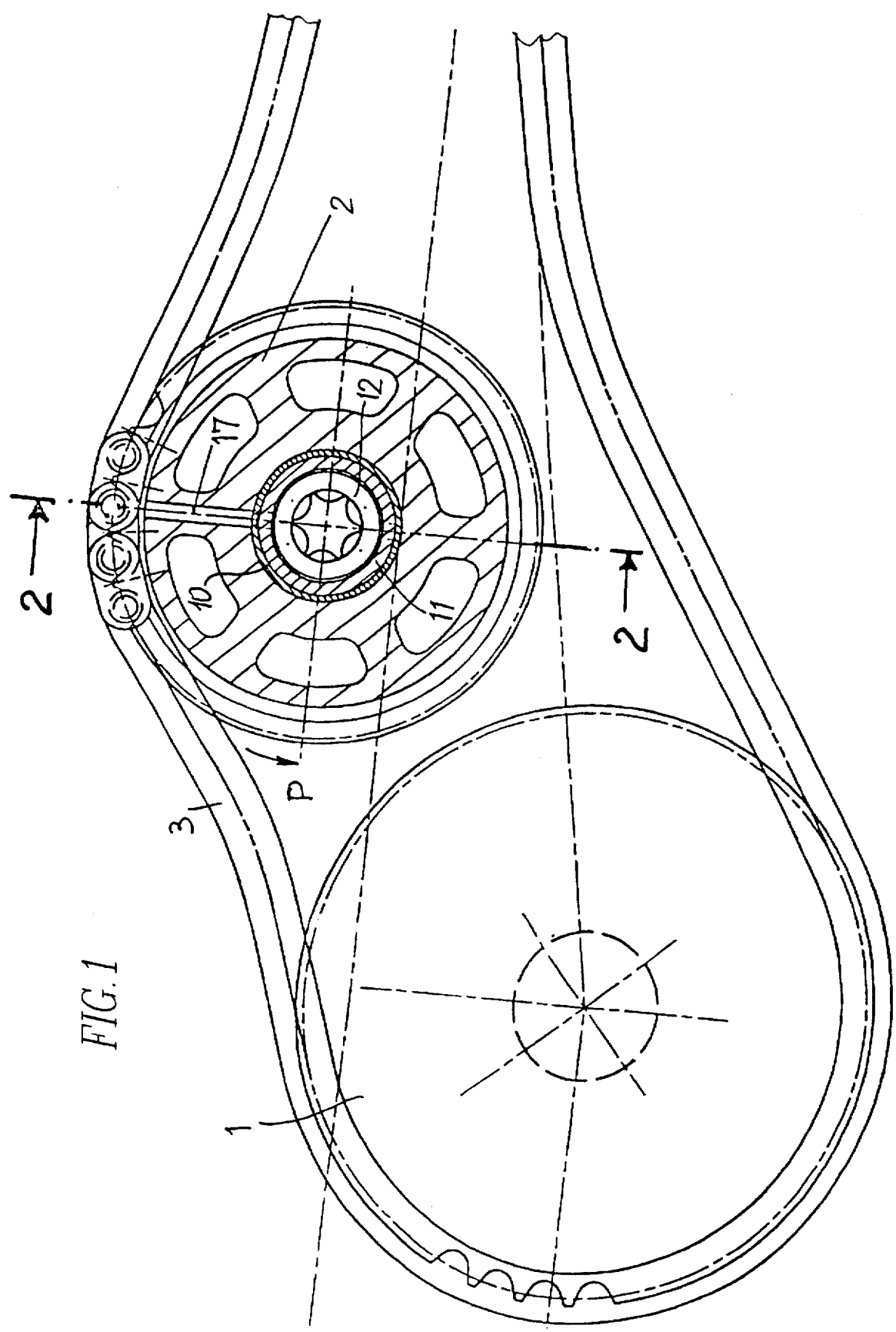
FIG. 1 is a side view of a part of a chain drive showing one chain gear in cross-section.

FIG. 1 shows a chain drive as it is used for example for driving a cam shaft of an internal combustion engine. It includes a chain gear 1 with an intermediate gear 2 around which for example a double link chain 3 extends. Correspondingly the gears 1 and 2 are each provided with two gear rims 4 and 5 (FIG. 2). Each link of the double link chain has two sleeves 6, 7 which are disposed on a common bolt 8 and cooperate each with one of the gear rims 4 and 5, respectively. Adjacent links are interconnected by side straps 9.

As shown in FIG. 2, the intermediate gear 2 includes a bearing sleeve 10 which is pressed into its hub and by which it is rotatably supported on a stationary trunnion 11 which is mounted on a housing 13 by a bolt 12. Lubrication of the friction bearing is achieved from a pressure space 14 by way of a transverse bore 15 in the trunnion 11 and an annular groove 16 formed into the bearing surface of the bearing sleeve 10.

For the lubrication of the chain 3, the intermediate gear 2 includes a radial bore 17 which is in communication with the annular groove 16 by way of a connecting groove 18 in the bearing surface of the bearing sleeve 10. The radial bore 17 extends between the gear rims 4 and 5 and opens at the circumference of the intermediate disc 2' between the two gear rims 4 and 5, that is in an area where the chain 3 is disposed at only a small distance from the opening. The centrifugal forces acting on the lubricant in the bore 17 transports the lubricant along the outer side strap 9 to the joint surface 20 between the sleeves 6, 7 and the bolt 8 which is the part of a chain most subject to wear. When the opening of the radial bore 17 is fully freed from the chain 3 after a certain movement of the gear 2, the lubricant, now spraying from the bore 17, reaches the chain over a larger area which is again lubricated thereby. Upon rotation of the gear 2 in the direction of the arrow P, the oil jet reaches the chain until just before it is taken up by the chain gear 1 providing for a good lubrication of the surface between the chain 3 and the chain gear 1. The connecting groove 18 is dimensioned in its width and depth such that it throttles the lubricant flow to the desired volume.

The invention is not limited to the embodiment described herein. In an arrangement with a simple chain drive for example the opening of the radial bore 17 could be arranged between two adjacent teeth of a gear ring as it is shown for the arrangement disclosed in the DE GM 92 00 487 referred to earlier. The chain gear may of course also include more than the one radial bore 17 as described herein.

What is claimed is:

1. A chain drive, particularly for an accessory drive of an internal combustion engine comprising at least two chain gears and a chain extending around said chain gears, at least one of said chain gears including a hub with a bearing sleeve disposed on a stationary trunnion on which said one chain gear is rotatably supported, said trunnion having a radial bore in communication with a lubricant supply and said bearing sleeve having a circumferential groove formed therein at the radially outer end of said bore, and said one chain gear having a radial passage, said bearing sleeve having a bearing surface disposed adjacent said stationary trunnion and including a connecting groove extending in said bearing sleeve between said circumferential groove and a radial opening in said sleeve which is in alignment with said radial passage for delivering lubricant thereto, said radial passage having at its radially outer end an opening arranged adjacent said chain for delivering lubricant to said chain and said connecting groove having a width and a depth sized so as to form a throttle area by which lubricant flow is limited to a certain amount and said lubricant supply is maintained under pressure.

2. A chain drive according to claim 1, wherein said chain is a double link chain and said chain gear includes two adjacent gear rims engaged by said double link chain, said radial passage having an opening disposed between said two adjacent gear rims.

\* \* \* \* \*